US008687922B2

(12) United States Patent
Tripathi et al.

(10) Patent No.: US 8,687,922 B2
(45) Date of Patent: Apr. 1, 2014

(54) PARALLEL SCALER PROCESSING

(75) Inventors: Brijesh Tripathi, San Jose, CA (US);
Nitin Bhargava, San Jose, CA (US);
Craig M. Okruhlica, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/404,850

(22) Filed: Feb. 24, 2012

(65) Prior Publication Data

US 2013/0223764 A1 Aug. 29, 2013

(51) Int. Cl.
*G06K 9/32* (2006.01)

(52) U.S. Cl.
USPC ............ 382/298; 382/300; 382/260; 382/261

(58) Field of Classification Search
USPC .................................. 382/298, 300, 260–261
See application file for complete search history.

(56) References Cited

U.S. PATENT DOCUMENTS

| 5,204,916 | A | | 4/1993 | Hamilton, Jr. et al. | |
|---|---|---|---|---|---|
| 5,353,056 | A | | 10/1994 | Westerink et al. | |
| 5,384,912 | A | | 1/1995 | Ogrinc et al. | |
| 5,574,572 | A | * | 11/1996 | Malinowski et al. | 358/451 |
| 6,724,948 | B1 | * | 4/2004 | Lippincott | 382/298 |
| 6,903,733 | B1 | * | 6/2005 | Greenberg et al. | 345/204 |
| 6,924,948 | B2 | * | 8/2005 | Oshima et al. | 359/754 |
| 7,477,323 | B2 | * | 1/2009 | Chou | 348/581 |
| 7,609,326 | B2 | * | 10/2009 | Jen et al. | 348/581 |
| 8,121,434 | B2 | * | 2/2012 | Szeliski et al. | 382/298 |
| 2003/0122960 | A1 | | 7/2003 | Lafon | |
| 2007/0041662 | A1 | * | 2/2007 | Jeffrey | 382/298 |
| 2007/0230827 | A1 | | 10/2007 | Haukijarvi et al. | |
| 2009/0003730 | A1 | * | 1/2009 | Pande et al. | 382/298 |
| 2009/0154804 | A1 | * | 6/2009 | Nacman et al. | 382/167 |
| 2009/0256859 | A1 | * | 10/2009 | Komorowski et al. | 345/629 |

OTHER PUBLICATIONS

Extended Search Report in related European Patent Application No. 13156103.7-1906, Jun. 18, 2013, pp. 1-6.

* cited by examiner

*Primary Examiner* — Jayesh A Patel
(74) *Attorney, Agent, or Firm* — Rory D. Rankin; Meyertons, Hood, Kivlin, Kowert & Goetzel, P.C.

(57) ABSTRACT

A parallel scaler unit for simultaneously scaling multiple pixels from a source image. The scaler unit includes multiple vertical scalers and multiple horizontal scalers. A column of pixels from the source image is presented to the vertical scalers, and each vertical scaler selects appropriate pixels from the column of pixels for scaling. Each vertical scaler scales the selected pixels in a vertical direction and then conveys the vertically scaled pixels to a corresponding horizontal scaler. Each horizontal scaler scales the received pixels in a horizontal direction.

14 Claims, 14 Drawing Sheets

PARALLEL SCALER PROCESSING

BACKGROUND

1. Field of the Invention

The present invention relates generally to graphics information processing, and in particular to methods and mechanisms for scaling an image.

2. Description of the Related Art

Electronic devices with graphics processing capabilities have become increasingly popular in recent years, especially as these devices are becoming more and more affordable to the average consumer. Many different elements and functional units, such as scaler units, are utilized to perform graphics processing within these electronic devices. Scaler units, or scalers, are typically utilized to scale the size of an image or video frame. For example, in one particular scenario, a source image may be in an original format size of 800×600 pixels and may need to be scaled to 1024×768 pixels to fit a specific display type. Typically, scalers operate serially on one pixel per clock, and scaling often involves fetching and refetching the data needed for each pixel. This type of scaling is inefficient and places too much stress on the memory of the graphics processing system.

SUMMARY

In one embodiment, a graphics processing system is contemplate which includes a scaler unit, where the scaler unit may include a plurality of vertical scalers and horizontal scalers. The graphics processing system may include a pipeline of multiple stages wherein a different type of processing may be performed on a source image in each stage. The source image may be processed or manipulated (e.g., rotated) by one or more pipelines stages prior to being conveyed to the scaler unit. In one embodiment, the vertical scalers may be located at the front-end of the scaler unit. The vertical scalers may fetch or receive source image pixels from a rotation unit, which may be the stage preceding the scaler unit in the graphics processing pipeline.

In one embodiment, the scaler unit may include four vertical scalers, and each of the four vertical scalers may be configured to scale pixels in a vertical direction. Each vertical scaler may include a multi-tap polyphase filter for performing the vertical scaling. Each vertical scaler may include a multiplexer corresponding to each tap of the multi-tap polyphase filter, and the multiplexer may be configured to select an appropriate pixel from the column of pixels presented to the vertical scaler.

The output of each vertical scaler may be conveyed to a corresponding horizontal scaler. The horizontal scalers may be configured to perform a horizontal scaling of the pixels received from the vertical scalers. In one embodiment, there may be a horizontal scaler for each vertical scaler in the scaler unit. Each horizontal scaler may include a multi-tap polyphase filter and a chain of shift registers coupled to the taps of the multi-tap polyphase filter. Each vertically scaled pixel output from a corresponding vertical scaler may be shifted through the chain of shift registers in the horizontal scaler.

In one embodiment, the source image may be partitioned into a plurality of tiles. The scaler unit may be configured to process the source image on a tile-by-tile basis. A column of pixels spanning one or more tiles may be fetched by the vertical scalers, starting with the leftmost column of the upper-left tile of the image. Then, after the left-most column of the tile is fetched, then the next column to the right may be fetched, and so on, until the right edge of the tile is reached. Then the tile below the upper-left tile may be processed, and this pattern may continue all the way down the leftmost column of tiles within the image. Then, the next column of tiles to the right may be processed, and this process may continue until all of the columns of tiles of the image have been processed.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
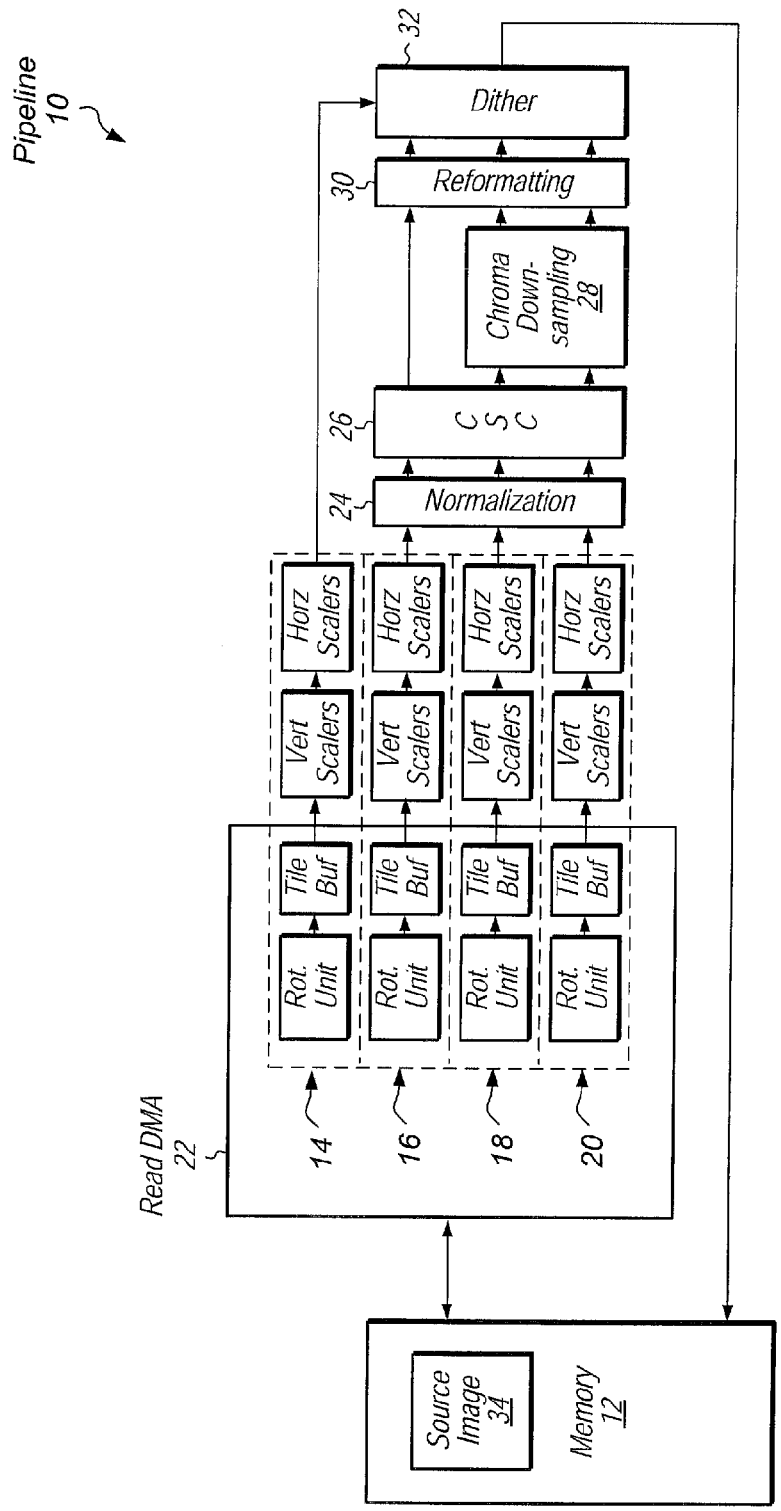
FIG. 1 is a block diagram that illustrates one embodiment of a graphics processing pipeline.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a plurality of vertical scalers. . . . " Such a claim does not foreclose the apparatus from including additional components (e.g., a processor, a cache, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a graphics processing pipeline is shown. In various embodiments, pipeline 10 may be incorporated within a system on chip (SoC), an application specific integrated circuit (ASIC), an apparatus, a processor, a processor core or any of various other similar devices. In some embodiments, one or more instances of pipeline 10 may be included within a SoC or other device.

Source image 34 may be stored in memory 12, and source image 34 may be a still image or a frame of a video stream. In other embodiments, source image 34 may be stored in other locations. Source image 34 is representative of any number of images, videos, or graphics data that may be stored in memory 12 and processed by pipeline 10. Memory 12 is representative of any number and type of memory devices (e.g., dynamic random access memory (DRAM), cache).

Source image 34 may be represented by large numbers of discrete picture elements known as pixels. In digital imaging, the smallest item of information in an image or video frame may be referred to as a "pixel". Pixels are generally arranged in a regular two-dimensional grid. Each pixel in source image 34 may be represented by one or more pixel components. The pixel components may include color values for each color in the color space in which the image is represented. For example, the color space may be a red-green-blue (RGB) color space. Each pixel may thus be represented by a red component, a green component, and a blue component. In one embodiment, the value of a color component may range from zero to $2^{N-1}$, wherein 'N' is the number of bits used to represent the value. The value of each color component may represent a brightness or intensity of the corresponding color in that pixel. Other color spaces may also be used, such as the luminance and chrominance representation (YCrCb). Furthermore, additional pixel components may be included. For example, an alpha value for blending may be included with the RGB components to form an ARGB color space. The number of bits used to store each pixel may depend on the particular format being utilized. For example, pixels in some systems may require 8 bits, whereas pixels in other systems may require 10 bits, and so on, with any of various numbers of bits per pixel being used in various systems.

Pipeline 10 may include four separate channels 14-20 to process up to four color components per pixel. Each channel may include a rotation unit, a set of tile buffers, a set of vertical scalers, and a set of horizontal scalers. In one embodiment, channel 14 may process an alpha channel. In other embodiments, channel 14 may not be utilized, and instead only three channels 16-20, corresponding to three color components, may be utilized. The read direct memory access (RDMA) unit 22 may be configured to read graphics data (e.g., source image 34) from memory 12. RDMA unit 22 may include four rotation units, four tile buffers, and a DMA buffer (not shown). The four tile buffers may be utilized for storing rotated tiles of source image 34.

There may be a plurality of vertical scalers and horizontal scalers for each color component of the source image. Each set of vertical scalers may fetch a column of pixels from the corresponding set of tile buffers. In another embodiment, pixels may be conveyed to the vertical scalers from the tile buffers. Each set of vertical scalers per channel may include any number of vertical scalers. In one embodiment, there may be four separate vertical scalers within pipeline 10 for each color component channel. In other embodiments, other numbers of vertical scalers may be utilized per color component channel.

Source image 34 may be partitioned into a plurality of tiles and may be processed by rotation units tile-by-tile, and tiles that are rotated may be stored in one of the tile buffers in each color component channel. In one embodiment, there may be four tile buffers per channel, although in other embodiments, other numbers of tile buffers may be utilized. In one embodiment, the vertical scalers may fetch a column of pixels from corresponding tile buffers. The column of pixels may extend through one or more tiles of the source image.

The column of pixels may be conveyed to multiplexers at the front-end of the vertical scalers. Each vertical scaler may include a plurality of multiplexers, with a multiplexer for each tap of the multi-tap polyphase filter of the vertical scaler. Each multiplexer may select the appropriate pixel from the column of pixels, with the appropriate pixel being determined based on the type of scaling being performed. Each vertical scaler of the set of vertical scalers may be configured to process one or more pixels and to output a single vertically scaled pixel.

As source image 34 is being processed, the vertical scalers may be configured to utilize a digital differential analyzer (DDA) to keep track of the current position in the source image. The DDA may include an initial position and a step that determines how many pixels or sub-pixels of source image 34 that the DDA moves during each step through the image. The term "sub-pixel" refers to a portion of a pixel when the step size is less than a single pixel or if the DDA lands somewhere between pixels due to a step size with a fractional portion after the decimal point. The step size controls the scaling factor, such that a step of less than one corresponds to upscaling and a step of greater than one corresponds to downscaling.

Source image 34 may be partitioned into tiles, and in one embodiment, the tiles may be 16 rows of pixels by 128 columns of pixels. However, the tile size may vary in other embodiments. The width of source image 34 may be greater than the width of the tile such that multiple tiles may be utilized to make up each row of source image 34. Also, the length of source image 34 may be greater than the length of the tile such that multiple tiles may be utilized to make up each column of source image 34.

Each set of vertical scalers may process source image 34 one tile at a time, beginning with the top-left tile of source image 34. In one embodiment, the vertical scalers may fetch pixels from a single column of source image 34 in a single clock cycle. The vertical scalers may perform as many fetches as are needed to fetch the required amount of pixels from a single column. The required amount of pixels may be based on the number of vertical scalers, the number of taps in the multi-tap polyphase filter of each vertical scaler, and the type of scaling being performed. In some embodiments, the required amount of pixels may span more than one tile of source image 34.

After scaling all of the pixels from a column of the tile, the vertical scalers may move one column to the right within the tile and fetch pixels from this column. The vertical scalers may continue moving to the right until the right-edge of the tile has been reached. Then, the vertical scalers may move down the tile to lower rows and continue with this process until the entire tile has been fetched. In some cases, only a single pass through the tile may be needed if the number of pixels processed on the first pass is equal to or greater than the number of pixels in a column of the tile. After a tile has been vertically scaled, the vertical scalers may move to the tile directly below the just-completed tile, unless the just-completed tile is the bottom tile of the image. In that case, after a full column of tiles from the image have been fetched and vertically scaled, the vertical scalers may move to the next column of tiles to the right and continue this pattern until all of the pixels from the entire image have been fetched and vertically scaled.

Each vertical scaler may be configured to generate a vertically scaled pixel on each clock cycle and convey the pixel to a corresponding horizontal scaler. In one embodiment, there may be four separate horizontal scalers within the pipeline for each color component channel, while in other embodiments, other numbers of horizontal scalers may be utilized per color component channel. In various embodiments, there may be a horizontal scaler corresponding to each vertical scaler within each color component channel of pipeline 10.

Each horizontal scaler may receive a vertically scaled pixel from a corresponding vertical scaler, and the vertically scaled pixel may be coupled to the input of a chain of shift registers. There may be a shift register for each tap of the multi-tap polyphase filter of the horizontal scaler. The horizontal scaler may generate horizontally scaled pixels from the received pixels.

In each color component channel, the horizontal scalers may output vertically and horizontally scaled pixels to normalization unit 24. In one embodiment, normalization unit 24 may be configured to convert received pixel values to the range between 0.0 and 1.0. For example, in one embodiment, the 10-bit pixel values output from a horizontal scaler may take on values from 0 to 1023. In such an embodiment, normalization unit 24 may divide the value received from the horizontal scaler by 1023 to change the range of the value. In other embodiments, normalization unit 24 may divide by other values depending on the number of bits used to represent pixel values. Also, normalization unit 24 may be configured to remove an optional offset from one or more of the pixel values. As shown in FIG. 1, the horizontal scalers in channel 14 are coupled to dither unit 32. In one embodiment, channel 14 may process an alpha channel and the outputs of the horizontal scalers in channel 14 may be conveyed to dither unit 32.

Normalization unit 24 may convey normalized pixel values to color space conversion (CSC) unit 26. CSC unit 26 may be configured to convert between two different color spaces. For example, in one embodiment, pixel values may be represented in source image 34 by a RGB color space. In this embodiment, the output of pipeline 10 may need to be in a YCbCr color space, and so CSC unit 26 may convert pixels from the RGB color space to the YCbCr color space. Various other color spaces may be utilized in other embodiments, and CSC unit 26 may be configured to convert pixels in between these various color spaces.

In one embodiment, CSC unit 26 may convey pixels to chroma downsampling unit 28. Chroma downsampling unit 28 may be configured to downsample the chroma components of the pixels based on the type of downsampling being performed (e.g., 4:2:2, 4:2:0). For example, in one embodiment, if the destination image is specified to utilize a 4:2:0 structure, then chroma downsampling unit 28 may perform vertical and horizontal downsampling of the chroma pixel components of the source image. In some scenarios, chroma downsampling unit 28 may be a passthrough unit if there is no downsampling of the chroma pixel components.

Chroma downsampling unit 28 may be coupled to reformatting unit 30. Reformatting unit 30 may be configured to reverse the normalization that was performed by normalization unit 24. Accordingly, the pixel values may be returned to the previous range of values that were utilized prior to the pixels being normalized by normalization unit 24. Pixels may pass through dither unit 32 after being reformatted, and dither unit 32 may insert noise to randomize quantization error. The output from dither unit 32 may be the processed destination image. In various embodiments, the processed destination image may be written to a frame buffer, to memory 12, to a display controller, to a display, or to another location. In other embodiments, graphics processing pipeline 10 may include other stages or units and/or some of the units shown in FIG. 1 may be arranged into a different order. Pipeline 10 is one example of a graphics processing pipeline and the methods and mechanisms described herein may be utilized with different types of other graphics processing pipelines.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
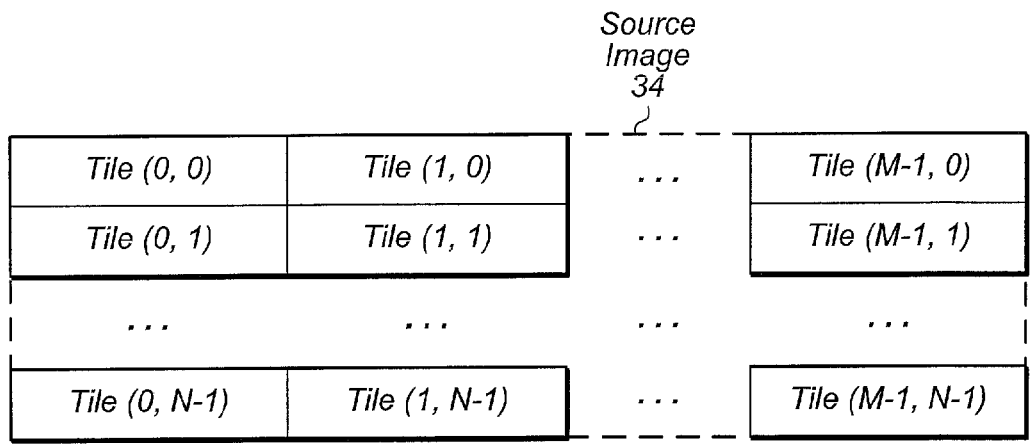
FIG. 2 is a source image partitioned into a plurality of tiles in accordance with one or more embodiments.

Turning now to FIG. 2, a block diagram of one embodiment of a source image partitioned into a plurality of tiles is shown.

In one embodiment, source image 34 may be partitioned into M tiles in the horizontal direction and N tiles in the vertical direction. The tiles in the first column are numbered (0,0), (0,1), and so on, down to (0, N−1). The tiles in the first row are numbered (0,0), (1,0), and so on, over to (M−1, 0).

The size of an individual tile may vary from embodiment to embodiment. For example, in one embodiment, an individual tile may be 16 lines by 128 columns, such that each line contains 128 pixels. In another embodiment, the image tile lines may be extended to 142 pixels by fetching an additional seven pixels from adjacent tiles on the left and right sides of the tile. On the left edge of source image 34, the leftmost pixel may be repeated seven times and on the right edge of source image 34, the rightmost pixel may be repeated seven times. The fetching of pixels from adjacent tiles on the right and left edges of the tile (or repeating of edge pixels) may be performed to facilitate a 15-tap polyphase filter in each horizontal scaler, such that when a pixel on the edge of the tile is being horizontally scaled, there are seven extra pixels on the left-side for the left edge of the tile, and seven extra pixels on the right-side for the right edge of the tile. This allows the 15-tap polyphase filter to scale the edge pixels in a consistent fashion. In other embodiments, with other numbers of tap in the horizontal polyphase filter, other numbers of pixels may be fetched or repeated on the edges of tiles.

In one embodiment, the architecture within a scaler unit may begin with a plurality of vertical scalers followed by a plurality of horizontal scalers. In one embodiment, there may be four vertical scalers operating on pixel data in parallel. In other embodiments, other numbers of vertical scalers may be utilized to operate on input pixel data in parallel. The vertical scalers architecture/blocks may operate on tiles by starting at the top left of the image, tile (0,0), and moving down the first column until reaching tile (0, N−1). After operating on the first column, the vertical scalers may move to the top of the next column, tile (1,0). The vertical scalers may traverse through the tiles of the second column to the bottom of the column, and continue with this pattern until reaching the bottom right tile (M−1, N−1) of the image.

Figure 3:
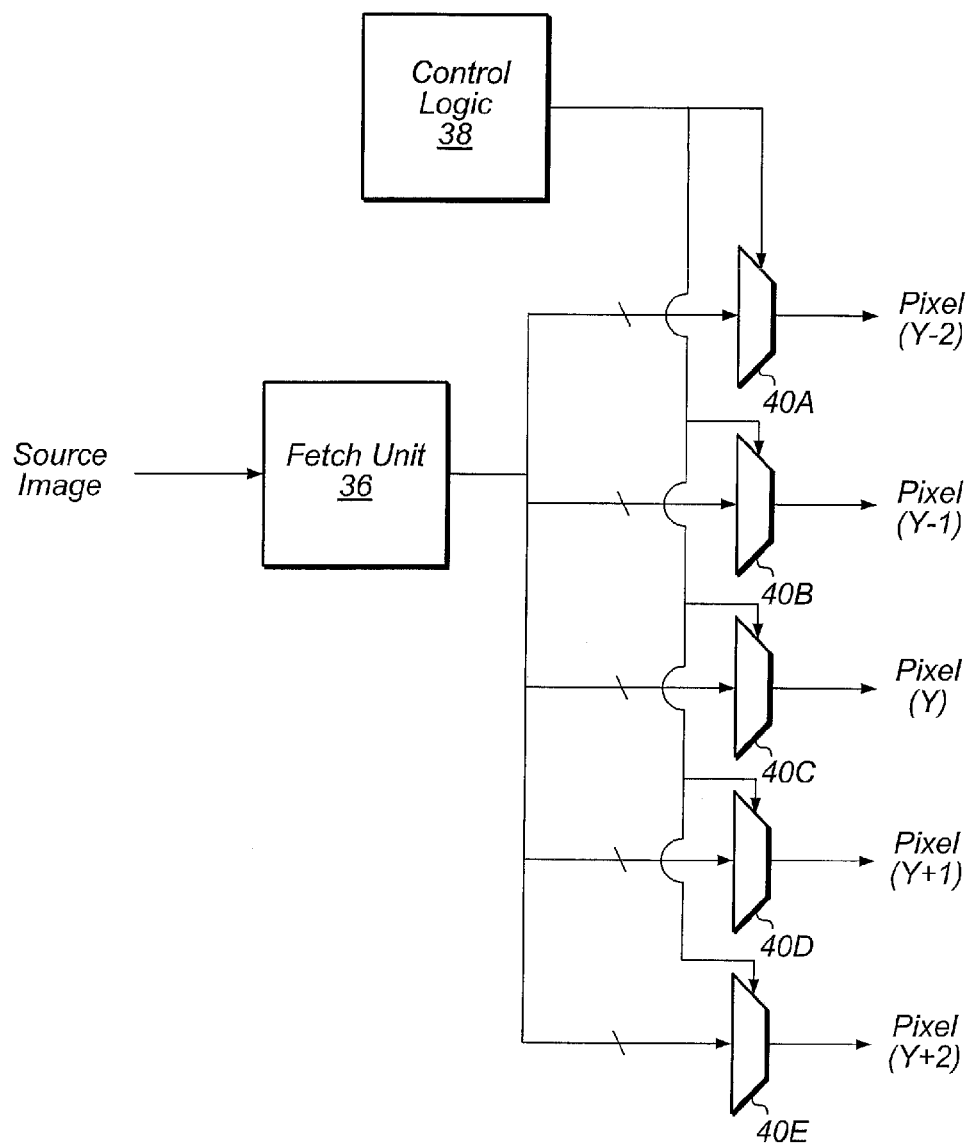
FIG. 3 is a block diagram of the front end of a vertical scaler in accordance with one or more embodiments.

Referring now to FIG. 3, a block diagram of one embodiment of the front end of a vertical scaler is shown. The front end of the vertical scaler may include fetch unit 36 for fetching pixels from the source image. In one embodiment, fetch unit 36 may fetch pixels from tile buffers, which may store pixels processed by a previous stage of the graphics pipeline. In another embodiment, the source image may be stored in memory and fetch unit 36 may fetch pixels from memory. The term "source image" may refer to an image stored in memory or to an image received from a previous stage (e.g., rotation unit) of a graphics processing pipeline. Additionally, the term "source image" may refer to an actual image or to a frame from a video stream. Furthermore, the terms "fetch unit" and "fetch logic" may be used interchangeably throughout this disclosure.

In one embodiment, there may be a single fetch unit 36 for all of the vertical scalers within the overall scaler unit. In another embodiment, each vertical scaler may have a separate fetch unit. Fetch unit 36 may fetch a column of pixels and present the column of pixels to multiplexers 40A-E. Multiplexers 40A-E are representative of any number of multiplexers that may be utilized within a vertical scaler. In one embodiment, there may be a multiplexer for each tap of the polyphase filter within the vertical scaler. The output from each of multiplexers 40A-E may be conveyed to a corresponding tap of the polyphase filter.

Control logic 38 may control the select signals to multiplexers 40A-E. Control logic 38 may utilize a digital differential analyzer (DDA) to keep track of the current pixel position in the source image. The DDA has an initial position and a step that determines how many pixels or sub-pixels of the source image that the DDA moves on each pass through the working set of tiles. In one embodiment, the DDA values and step sizes may be stored in registers located in control logic 38. The step size controls the scaling factor. A step of less than one results in upscaling and a step of greater than one results in downscaling.

In one embodiment, the initial DDA value may be read from a 24-bit register in 4.20 two's complement format. The 4.20 format may be defined as a 4-bit integer portion with a 20-bit fractional portion, with the "." representing the decimal point separating the integer from the fractional portion of the value. The 4.20 format of the initial DDA value may represent a minimum or maximum initial DDA value of −8 to +7 relative to pixel (0,0) of the source image. As the scalers iterate through the input pixels of the source image, the step value may be added to the current DDA value, generating the next DDA value. In one embodiment, rounding may be implemented such that if bit 15 of the fraction portion of the DDA value is '1', then the 4-bit coefficient index (bits 19:16) may be rounded up. Also, if the DDA value's uppermost fractional bit (19) is '1', then the 4-bit integer portion of the value may be rounded up. In one embodiment, the maximum step value may be four. In this embodiment, the step value may be a 23-bit unsigned number in a 3.20 format, and the step value may be zero-extended to a 4.20 format for use in two's complement computations. In other embodiments, the maximum step value may be other values.

In another embodiment, the DDA value may be a 36-bit, twos complement number in 16.20 format. In other embodiments, other sizes and representation of DDA values may be utilized. When a 16.20 format is used to represent the DDA value, the 16-bit integer portion (after rounding) may be utilized to determine the pixel position of the source image. This value, divided by eight in the vertical case, and divided by 128 in the horizontal case, also may indicate which tile is being referenced. The 20-bit fractional component may be used as an index into a coefficient table. In one embodiment, there may be 16 values stored in the coefficient table, corresponding to 16 phases. In this embodiment, the upper 4 bits of the fractional component (after rounding) may be utilized to select between the 16 coefficients per tap. In other embodiments, other numbers of phases may be stored in the coefficient table, and other numbers of bits of the fractional component may be utilized to select between these phases.

The output of the vertical scalers may feed the input of the horizontal scalers, and the horizontal scalers may utilize 15-tap polyphase filters. The taps of the horizontal scalers may be fed like a shift register. To account for the filters, in one embodiment, the tiles may be expanded in the horizontal direction by repeating the first pixel of each line to seven pixels on the left-side of the tile, and by repeating the last pixel of each line to seven pixels on the right-side of the tile. In one embodiment, control logic 38 may be configured to select the edge pixel as the output of as many multiplexers as necessary on the edges of the source image.

Figure 4:
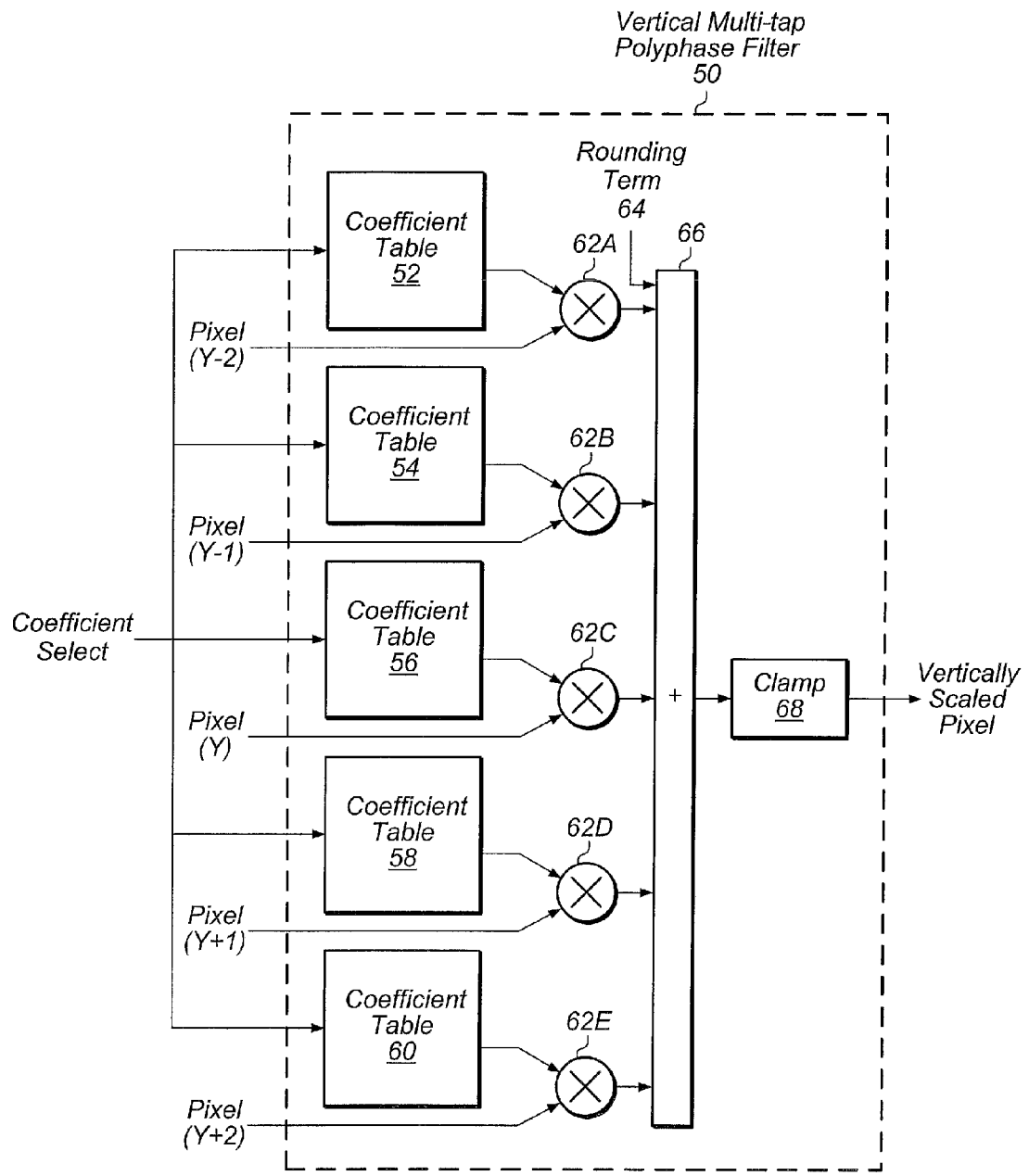
FIG. 4 is a block diagram that illustrates a vertical multi-tap polyphase filter in accordance with one or more embodiments.

Turning now to FIG. 4, a block diagram of one embodiment of a vertical multi-tap polyphase filter is shown. Each vertical scaler may include a vertical multi-tap polyphase filter 50. In one embodiment, multi-tap polyphase filter 50 may be a five-tap vertical scaler, and each of the five taps may include a coefficient table. In one embodiment, each coefficient table may include 16 entries. The pixel values may be centered on pixel variable Y, and the pixel values that are input to filter 50 may include Y−2, Y−1, Y, Y+1, and Y+2. Each pixel may be multiplied by a coefficient from the corresponding coefficient table of tables 52-60. Then the outputs from the five multipliers 62A-E and a rounding term 64 may be added together by adder 66, and then the result may be clamped by clamp unit 68. The output from clamp unit 68 may be a vertically scaled pixel, and this value may be conveyed to the input of a corresponding horizontal scaler. In one embodiment, pipelined logic may be utilized for implementing multipliers 62A-E and adder 66.

In one embodiment, the input pixel components to the vertical scalers may be 10 bits in a 10.0 unsigned format. In some embodiments, the 10.0 components may be extended to an 11-bit (11.0) two's complement value. In one embodiment, the coefficients (in the coefficient table) may be 16 bits in a 4.12 two's complement format. A component input and corresponding coefficient may be multiplied together at each tap of the filter, yielding a 27-bit (15.12) two's complement number. The outputs of the five tap multipliers may be added together (along with a rounding component) to produce a 30-bit (18.12) two's complement number. Then, pixel values less than zero or greater than one may be clamped back to a 14-bit (10.4) unsigned number. Values less than zero may be clamped to all zeros and values greater than or equal to ($\geq$) 1023 may be clamped to 1023 (0x3FF0)

Figure 5:
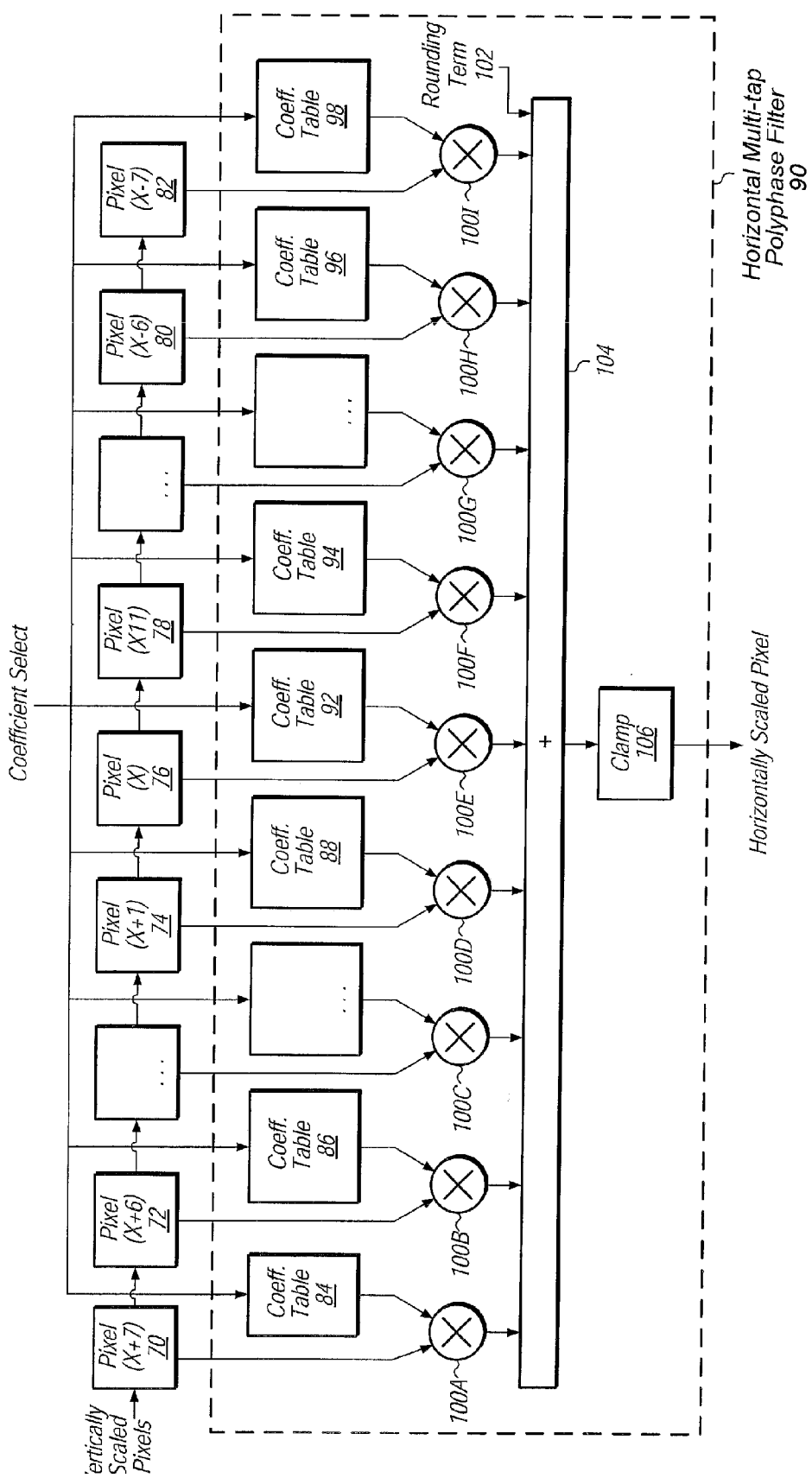
FIG. 5 is a block diagram of one embodiment of a horizontal multi-tap polyphase filter.

Referring now to FIG. 5, a block diagram of one embodiment of a horizontal multi-tap polyphase filter is shown. Each horizontal scaler may include a multi-tap polyphase filter 90. In one embodiment, filter 90 may be a 15-tap polyphase filter. In other embodiments, filter 90 may include other numbers of taps. Each tap may include a corresponding coefficient table 84-98. In one embodiment, each coefficient table may include 16 coefficient entries. In other embodiments, each coefficient table may include other numbers of coefficient entries.

As illustrated in FIG. 5, the pixel values may be centered around variable X, and the pixel values may include X+7, . . . , X+1, X, X-1, . . . , X-7. Each pixel in the chain of shift registers 70-82 may be multiplied by a coefficient from the corresponding coefficient table 84-98. The coefficients may be stored in programmable registers within coefficient tables 84-98. The outputs from the multipliers 100A-I and a rounding term 102 may be summed together in adder 104, and then the result from adder 104 may be clamped in clamp unit 106. The output from clamp unit 106 may be a horizontally scaled pixel, and this value may be conveyed to the input of a normalization unit (not shown), to another pipeline stage, or to another location. In one embodiment, the horizontal scaler may utilize pipelined logic for implementing the multipliers 100A-I and adder 104.

In one embodiment, there may be four horizontal scalers. In other embodiments, other numbers of horizontal scalers may be utilized. The four horizontal scalers may all be working on the same horizontal DDA value but on different vertical pixels. In some cases, when a vertical scaler conveys the left-most pixel of a row to the horizontal scalers, the horizontal scalers may flash-write the pixel into all 15 taps of the horizontal filter. The horizontal scalers may also set the center tap to point to column start pixel −7 to ensure proper pixel replication in the case of a negative initial DDA X value. In other cases, extra pixels may be fetched from adjacent tiles to allow the horizontal scalers to operate on edge pixels without repeating the edge pixels for multiple taps.

As a vertical scaler processes pixels and conveys the pixels to a horizontal scaler, pixels are shifted through the taps, increasing the pointer of the center tap. The horizontal scaler may compare the center tap to the pixel required by the current DDA value, and once the values match, then the horizontal scaler may start generating output pixels. On any given clock when the horizontal scaler is producing a scaled output pixel, if the next DDA value also matches the current center tap value, then the horizontal scaler may not shift in a new pixel and may stall the corresponding vertical scaler from pushing in a new pixel.

On the first pass through a new column of tiles, a horizontal scaler may snap a copy of the DDA value, as the horizontal scaler may need to reload this value at the beginning of subsequent passes through the same column. In one embodiment, the vertical scalers may notify the horizontal scalers if a new column is starting. On subsequent columns, the next DDA value may be the current DDA value plus the DDA step size.

In one embodiment, the horizontal scalers may be configured to determine one or more boundary conditions. The first tap in the horizontal shift chain may detect if it has the rightmost pixel of the source image, and in response to detecting this condition, the horizontal shift register chain may not accept any more pixels from the vertical scaler. The horizontal scaler may continue to increment the DDA value, and the scaler may continue to shift tap values, but since new pixels are not being shifted into the shift register chain, the rightmost pixel of the image may be replicated at the input of the shift register chain. In one embodiment, each horizontal scaler may also detect if the number of pixels generated is equal to the amount expected in the scaled output image. When a horizontal scaler detects this condition, the horizontal scaler may stop generating output pixels and set a flag indicating the end of the image has been reached. Then, the horizontal scaler may wait for a new pass to be started by the vertical scalers.

In one embodiment, the input pixel components to the horizontal scaler may be 14 bits in a 10.4 unsigned format, and these components may be extended to a 15-bit (11.4) two's complement value. The tap coefficients may be a 16-bit (4.12) two's complement value. The inputs and the coefficients may be multiplied together, yielding a 31-bit (15.16) two's complement value. The outputs of the 15 tap multipliers may be added together, along with a rounding component, to generate a 35-bit (19.16) two's complement number. Pixel values may then be clamped back to a 14-bit 10.4 unsigned number.

The examples described above and the different formats and bit-lengths of the different components and values are representative of one possible embodiment. It is noted that in other embodiments, the formats and bit-lengths of the various different values within the vertical and horizontal scalers may vary.

Figure 6:
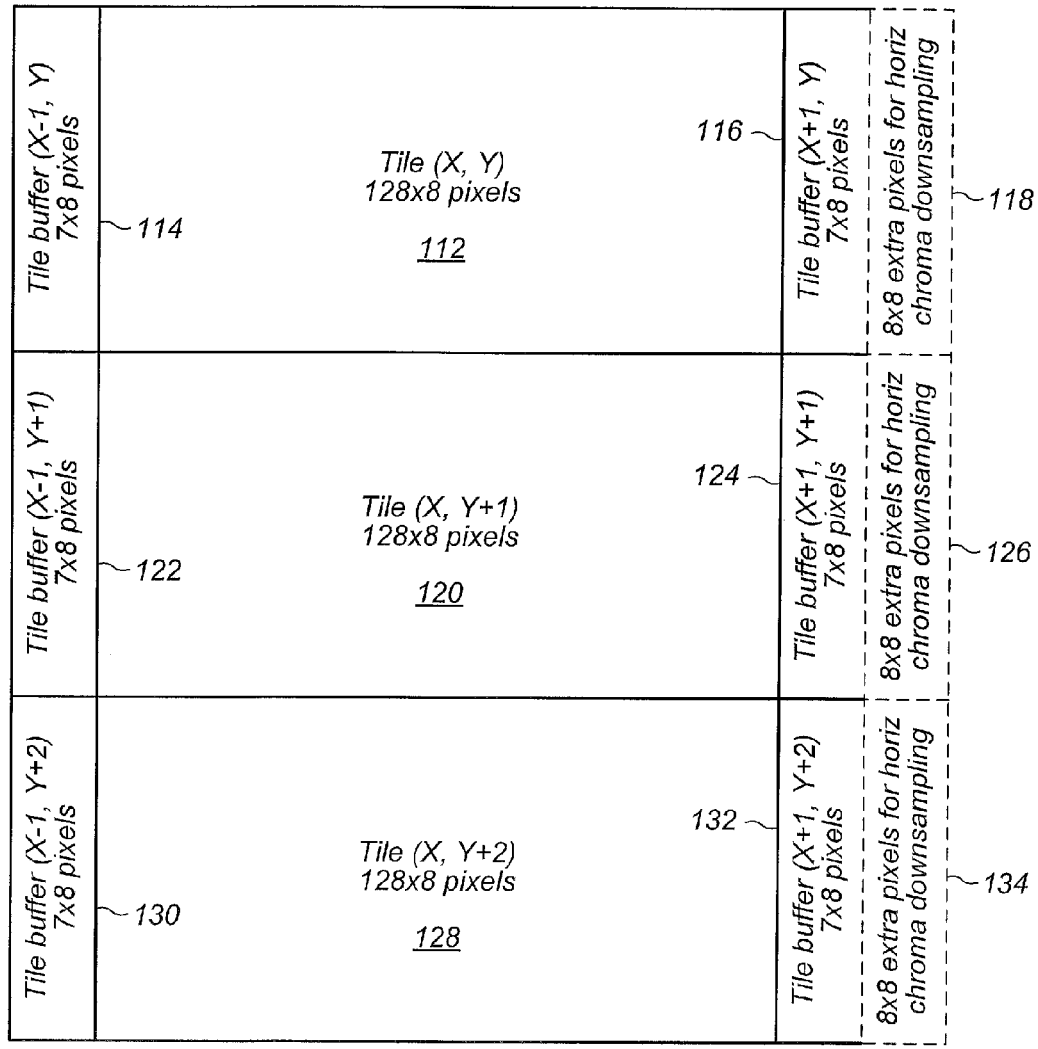
FIG. 6 is a block diagram of one embodiment of a working set of tiles.

Turning now to FIG. 6, a working set of tiles in accordance with one or more embodiments is shown. In one embodiment, the size of a tile may be 128×8 pixels and the working set of tiles may include three tiles (tiles 112, 120, and 128). In one embodiment, the working set of tiles may be stored in tile buffers at the output stage of a rotation unit. The tile buffers may be also coupled to the input stage of a scaler unit. In one embodiment, each tile of tiles 112, 120, and 128 may be stored in a separate tile buffer. The example shown in FIG. 6 is for illustrative purposes only, and in other embodiments, the working set of tiles may include other numbers of tiles and the tile sizes may vary.

In other embodiments, the selection and size of working set may depend on the number of taps in the multi-tap poly-phase filter of each vertical scaler and may depend on the number of vertical scalers in the scaler unit. The selection and size of the working set of tiles may also depend on the amount of vertical upscaling or downscaling being performed by the scaler unit. These factors may determine how many pixels need to be fetched and presented to the plurality of vertical scalers in the scaler unit on every clock cycle. For example, in one embodiment, there may be four vertical scalers in the scaler unit, each vertical scaler may include a five-tap polyphase filter, and the vertical scalers may be downscaling by a factor of four. In this embodiment, at least 17 pixels may need to be fetched in a single clock cycle from a single column to fetch enough pixels for all of the taps of the vertical scalers in the scaler unit. Since each tile includes 8 pixels per column, then at least three tiles may need to be fetched in this embodiment.

The four separate vertical scalers may be fed with an entire vertical column of 24 pixels from three tiles. Each of the vertical scalers may be a five-tap polyphase filter, such that each vertical scaler may select and utilize five pixels to produce a single vertically scaled pixel. The vertical column of 24 pixels may be presented to the vertical scalers, and each of the 20 taps of the four polyphase filters may pick which pixel it needs to produce a scaled output. In one embodiment, each tap of the multi-tap polyphase filter may include a multiplexer to select from the column of pixels. The top vertical scaler may work on the upper pixels, and then each of the three remaining vertical scalers may work one step below the adjacent vertical scaler, producing a total of four contiguous, vertically scaled pixels per clock.

In one example of a downscaling case, corresponding to a step size of four, each vertical scaler may consume four pixels per clock and produce one vertically downscaled pixel per clock. Likewise, each horizontal scaler may produce a pixel every four clocks, such that the source image is consumed at a net rate of sixteen pixels per clock and the scaled, output image will be generated at a net rate of one pixel per clock.

In one example of an upscaling case, each vertical scaler may consume 0.25 pixels per clock, producing one vertically upscaled pixel per clock. Each horizontal scaler may produce one pixel per clock, such that the input image is consumed at a net rate of one pixel per clock and the scaled output image may be generated at a net rate of four pixels per clock.

At the start of an image, the vertical scalers may wait for fetch logic to fill three 128×8 buffers with pixels and present them to the vertical scalers as columns of 24 pixels. The scaler control logic may calculate the first four DDA values for the four vertical scalers. The first vertical scaler may begin operating at the first DDA value (DDA-Init), the second vertical scaler may begin operating at (DDA-Init+1 step), the third vertical scaler may begin operating at (DDA-Init+2 steps), and the fourth vertical scaler may begin operating at (DDA-Init+3 steps).

The fetch logic may present the vertical scalers with a column of 24 pixels per clock and step horizontally across the tile until the right-most pixel is encountered. While operating on the current set of four DDA steps, the scaler logic may look at the next set of steps. If, in the next iteration, the current leading tile buffer is not needed, then the scaler logic may assert a signal to the fetch logic that the buffer is no longer needed. In response to this signal being asserted, when the fetch logic has presented the right-most pixel to the vertical scalers, the fetch logic may fetch the next tile of the source image and add this tile to the working set. If this signal is not asserted, the fetch logic may continue to present the current set of buffers to the scaler control logic for the next horizontal pass of the working set.

This process may continue until the scaler control logic detects the bottom edge of the source image. There may be many different boundary conditions for the scaler control logic to detect. One condition may be if any of the vertical scaler taps needs a pixel that is beyond the last pixel of the source image. If this condition is detected, then the scaler control logic may replicate the bottom pixel by feeding it into any tap that needs it. In one embodiment, the scaler control logic may also keep track of how many vertically scaled pixels have been generated. If, on the next iteration, all vertical scalers would be generating pixels beyond the end of the scaled output image, then the scaler control logic may assert a "done with current column" signal to the fetch logic.

When moving to the next column of tiles, the vertical scaler DDAs may be reloaded with the DDA-Init values (+0, 1, 2, and 3 steps for the four separate vertical scalers) since they will again be at the top of the image in the next column. The vertical scalers may continue to process columns until the horizontal scaler control logic determines that the right edge of the image has been reached. When the bottom right tile of the source image is reached, the vertical scalers may assert a "done with image source" signal. In some cases, the fetch logic may be able to determine this independently of the vertical and horizontal scalers.

The working set of tiles may also include extra pixels in sections 114, 122, and 130 on the left-side of the tiles 112, 120, and 128, respectively. These extra seven pixels may be fetched and included as part of the working set of tiles to accommodate the multi-tap polyphase filter of the horizontal scaler. In one embodiment, the horizontal scaler may include a 15-tap polyphase filter. In such an embodiment, an extra seven pixels on the left-side of the tiles may be included in the working set of tiles. When a horizontal scaler is centered on the leftmost pixel of tile 112, then the seven extra pixels in section 114 may allow the 15-tap filter to be populated with enough pixels to perform horizontal scaling in a normal fashion. In other embodiments, when extra pixels on the left-side of the tile are not fetched or included in the working set of tiles, the edge pixels may be repeated by the scaler fetch logic. The extra seven pixels in the right-side sections 116, 124, and 132 may serve a similar purpose when the 15-tap filter is centered on the right-most pixels of tiles 112, 120, and 128, respectively.

The sections on the far right-side of the working set of tiles, which includes sections 118, 126, and 134, may be included in the working set of tiles to accommodate downscaling in a later stage of the graphics processing pipeline. If chroma downscaling is enabled in a later stage, then each tile produced by the scaling unit may need to have an even number of pixels in each row so that the chroma downscaling unit can function properly. In one example of chroma downsampling, such as converting 4:4:4 to 4:2:2, two horizontal pixels are utilized to produce one pixel. Therefore, each row would need to have an even number of pixels. The types of scaling that can be performed vary according to each embodiment, and the type of scaling may produce an odd number of pixels in many cases. In these cases, the extra pixels in sections 118, 126, and 134 may be utilized to generate an extra pixel so that each row of the scaled tiles has an even number of pixels. In other embodiments, sections 118, 126, and 134 may be omitted from the working set of tiles. Once the vertical scalers have utilized all of the pixels of tile 112, then tile 112 may be retired. Then, a fetch unit may fetch the next tile and include this tile with tiles 120 and 128 as the new working set of tiles.

Figure 7:
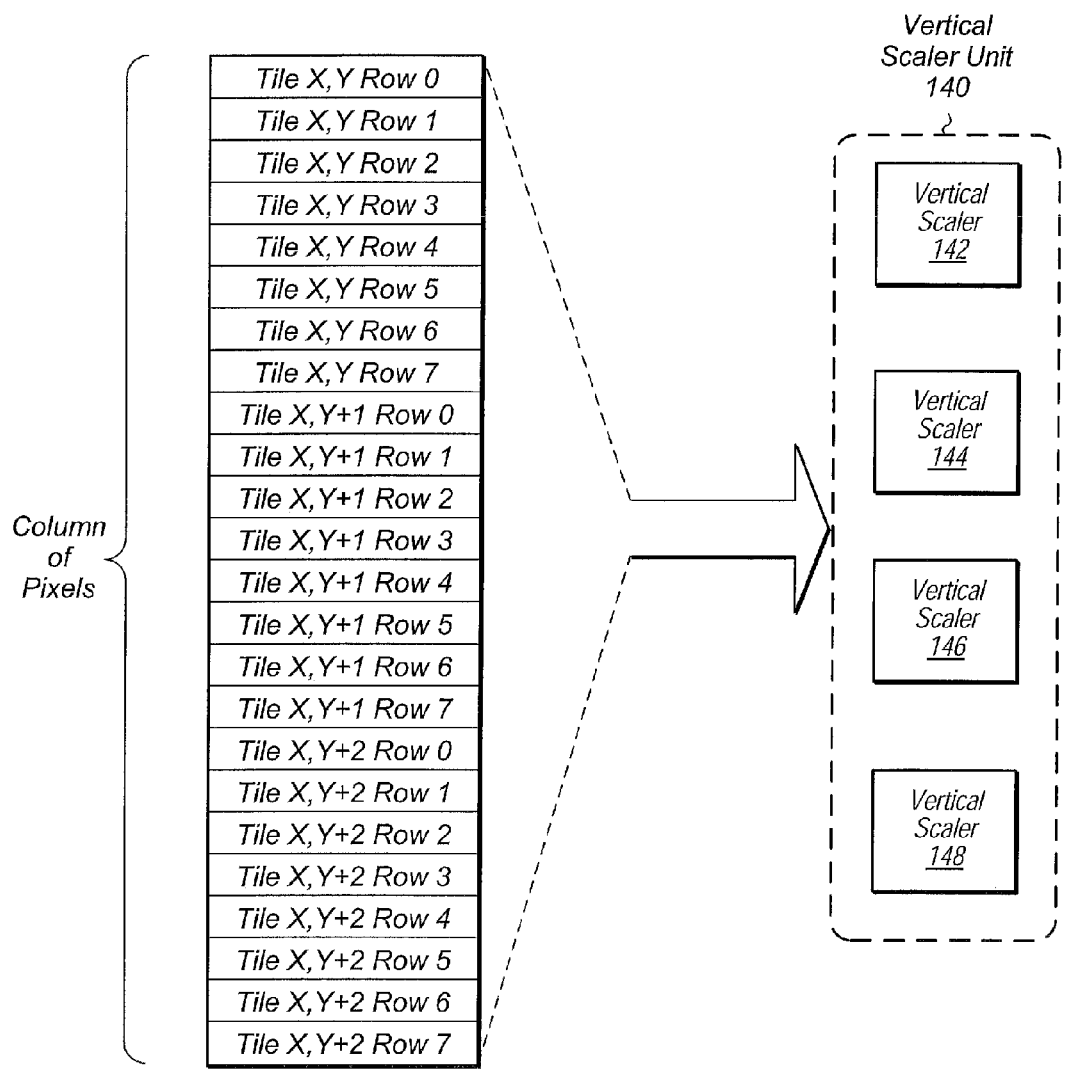
FIG. 7 is a block diagram of one embodiment of a column of pixels being presented to a vertical scaler unit.

Referring now to FIG. 7, a block diagram of one embodiment of a column of pixels being presented to a vertical scaler unit is shown. Vertical scaler 142 is at the top of vertical scaler unit 140, and each of the other three vertical scalers 144-148 may be one DDA step below the adjacent vertical scaler. Pixels in the column may span tiles (X,Y), (X,Y+1), and (X,Y+2). The pixels shown in FIG. 7 are from a single column of a source image, and the single column may come from a working set of tiles, such as the one shown in FIG. 6. In one embodiment, an entire column from the working set of tiles may include 24 pixels. In other embodiments, an entire column from the working set of tiles may include other numbers of pixels. For example, in another embodiment, a working set of four tiles may be employed, and each tile may have 16 rows, and so the entire column of pixels for this embodiment may be 64 pixels.

Figure 8:
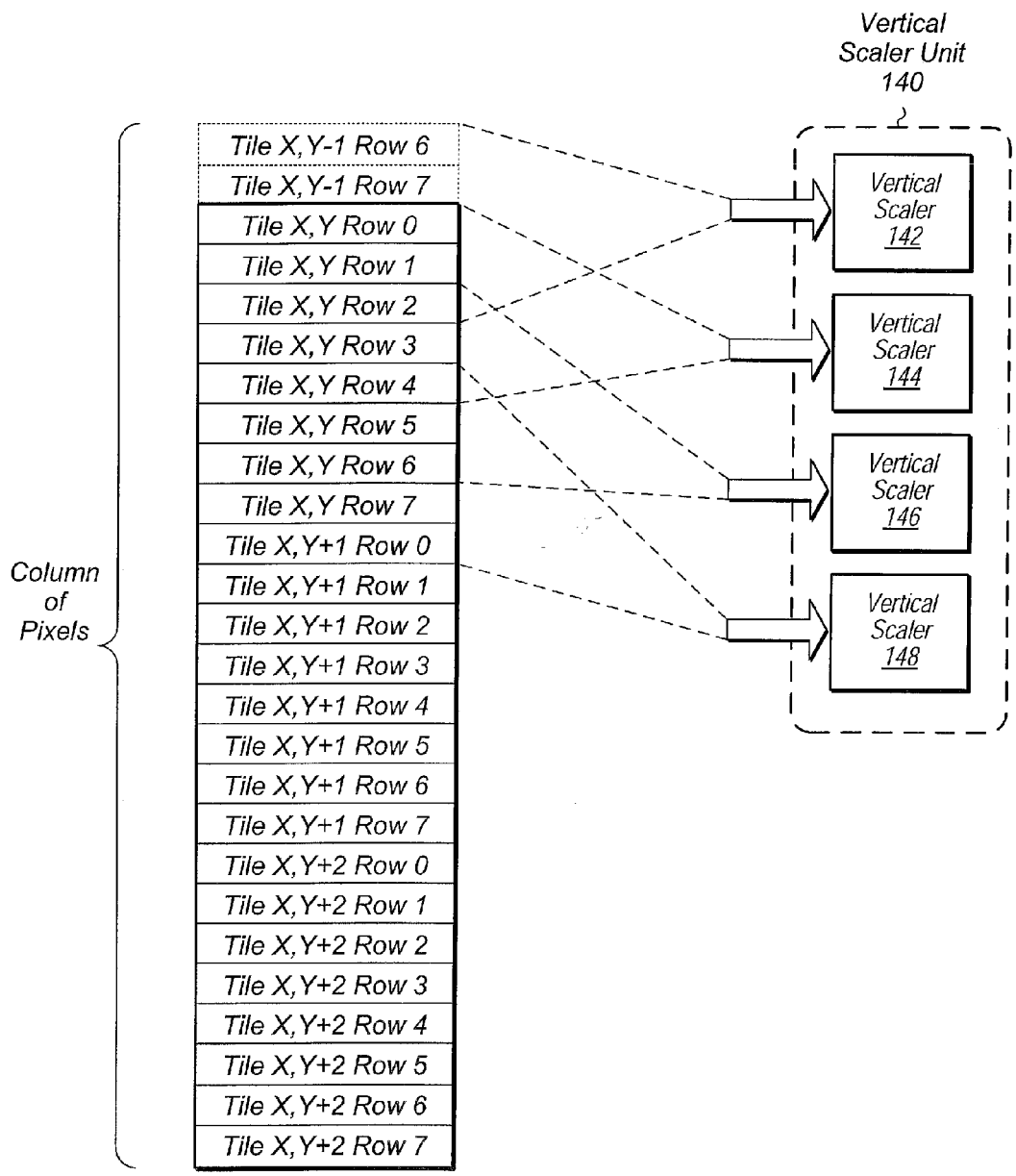
FIG. 8 is a block diagram of one embodiment of a selection of pixels by vertical scalers on a first horizontal pass.

Turning now to FIG. 8, a block diagram of one embodiment of the selection of pixels by vertical scalers on a first horizontal pass is shown. Vertical scaler unit 140 includes four vertical scalers 142-148, and the dashed lines indicate which pixels will be utilized by each vertical scaler. Vertical scaler 142 is centered on the pixel from row 0 of tile (X,Y), vertical scaler 144 is centered on the pixel from row 2 of tile (X,Y), vertical scaler 146 is centered on the pixel from row 4 of tile (X,Y), and vertical scaler 148 is centered on the pixel from row 6 of tile (X,Y). In this example, the initial DDA value is 0 and the step size is 2. In one embodiment, the bottom two pixels of tile (X,Y−1) may be included in the column of pixels, at the top of the column, to accommodate the five-tap filter of vertical scaler 142 which is centered on the pixel from row 0 of tile (X,Y). In another embodiment, the pixel from row 0 of tile (X,Y) may be repeated and selected by the top three multiplexers of vertical scaler 142 and used by the top three taps of the five-tap polyphase filter.

In one embodiment, each vertical scaler of vertical scalers 142-148 may include a five-tap polyphase filter. Each vertical scaler of vertical scalers 142-148 may also include five multiplexers, wherein each multiplexer is configured to select a pixel for a corresponding tap of the polyphase filter. In the example illustrated in FIG. 8, the five pixels selected by each vertical scaler will be assigned in order to the five taps. For example, the pixel from row 6 of tile (X,Y−1) will be selected by the multiplexer that is coupled to the top tap of the polyphase filter of vertical scaler 142, the pixel from row 7 of tile (X, Y−1) will be selected by the multiplexer that is coupled to the second from the top tap of the polyphase filter, and so on. Each of the other vertical scalers may select pixels using multiplexers coupled to the taps of their polyphase filters in a similar manner.

The example illustrated in FIG. 8 demonstrates the selection of pixels from the column of pixels for a vertical downscaling factor by two. A vertical downscaling factor of two indicates that the number of rows in the scaled image will be half of the number of rows in the source image. This example is for illustrative purposes only, and in other embodiments, vertical scalers 142-148 may be assigned to different pixels and the interval between scalers may vary depending on the type of downscaling or upscaling being performed.

In one embodiment, vertical scalers 142-148 may process columns of pixels starting at the left edge of a working set of tiles and moving horizontally to the right across the working set of tiles in a first horizontal pass. After moving all the way across the working set of tiles from the left edge to the right edge, each of the vertical scalers 142-148 may move down the working set of tiles by four times the DDA step size. For example, the DDA step size is two for this particular downscaling example, and so after reaching the right edge of the working set of tiles, each vertical scaler in vertical scaler unit 140 may move eight pixels down in the column of pixels and select pixels from those locations on a second horizontal pass through the working set of tiles.

Figure 9:
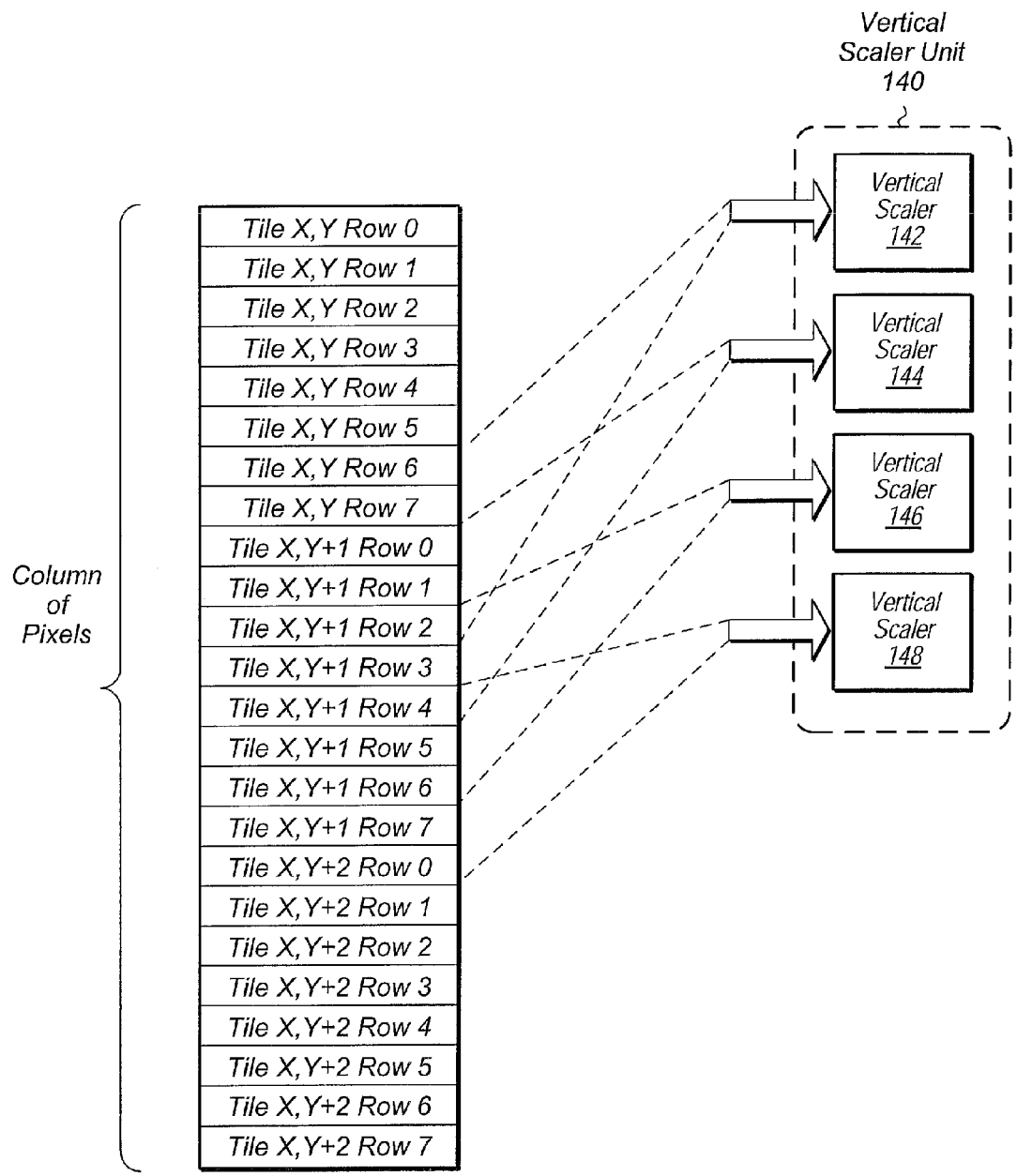
FIG. 9 is a block diagram of one embodiment of a selection of pixels by vertical scalers on a second horizontal pass.

Referring now to FIG. 9, a block diagram of one embodiment of the selection of pixels from the working set of tiles during a second horizontal pass through the working set of tiles is shown. On the second horizontal pass, each vertical scaler of vertical scaler unit 140 may select pixels from positions four DDA step sizes down the column of pixels from their previous locations. For the second pass, vertical scaler 142 is centered on the pixel from row 0 of tile (X,Y+1), vertical scaler 144 is centered on the pixel from row 2 of tile (X,Y+1), vertical scaler 146 is centered on the pixel from row 4 of tile (X,Y+1), and vertical scaler 148 is centered on the pixel from row 6 of tile (X,Y+1). This process of horizontal passes through the working set of tiles may continue moving down the source image until an entire column of tiles has been scaled. Then the process may move to the top of the next column of tiles to the right, and move down that column, and so on until the entire image has been vertically scaled. This example is a continuation of the example illustrated in FIG. 8, with a DDA step size of 2 corresponding to vertical downscaling by a factor of two. Other embodiments may utilize other step sizes, downscaling or upscaling factors, other numbers of fetched pixels, and other numbers of vertical scalers.

Figure 10:
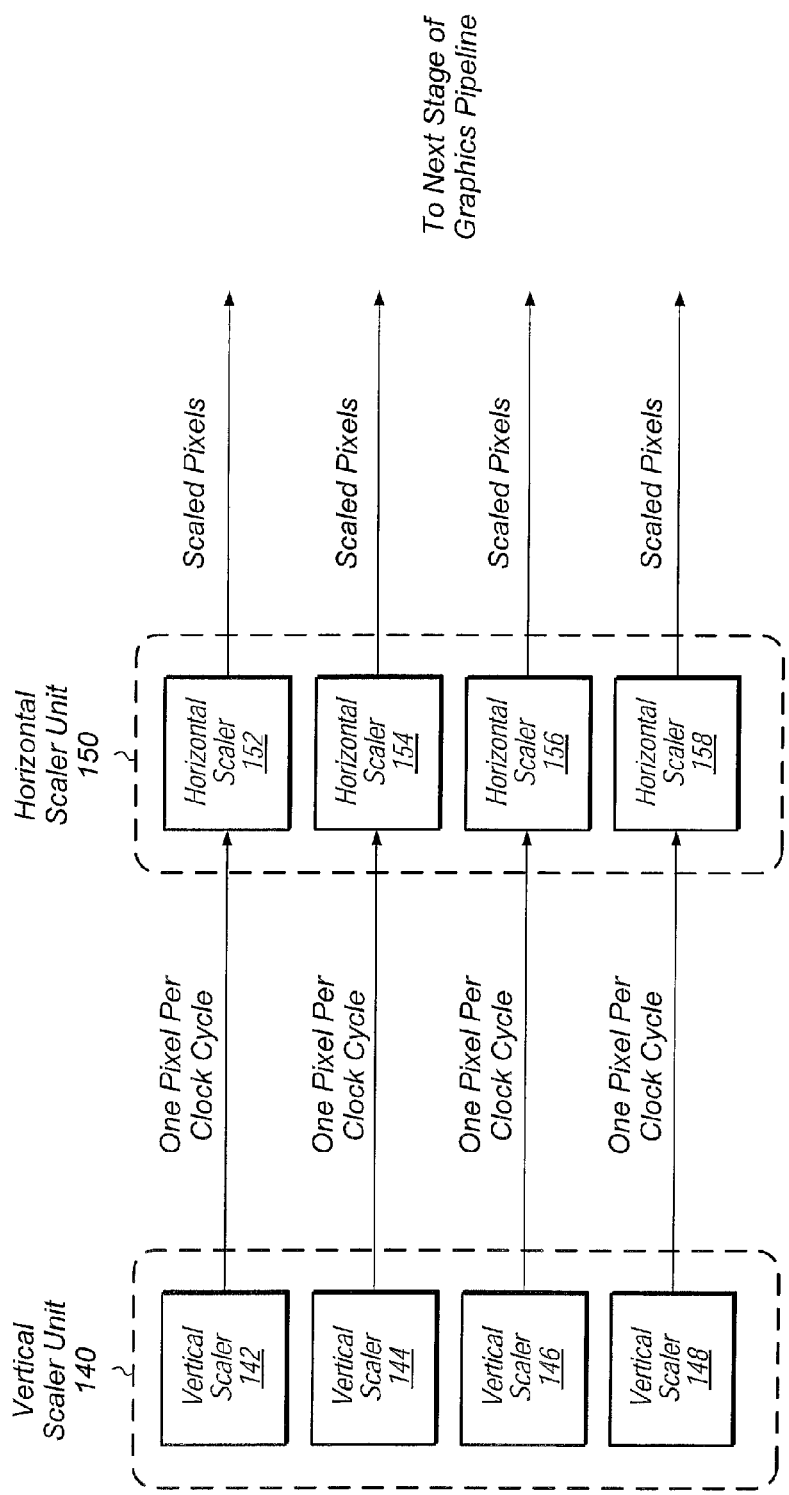
FIG. 10 is a block diagram of one embodiment of the connections between vertical and horizontal scalers.

Turning now to FIG. 10, a block diagram of one embodiment of the connections between vertical and horizontal scalers is shown. In one embodiment, each vertical scaler 142-148 of vertical scaler unit 140 may be coupled to a corresponding horizontal scaler 152-158 of horizontal scaler unit 150. Vertical scaler 142 may output a single vertically scaled pixel per clock cycle to horizontal scaler 152, vertical scaler 144 may output a single vertically scaled pixel per clock cycle to horizontal scaler 154, vertical scaler 146 may output a single vertically scaled pixel per clock cycle to horizontal scaler 156, and vertical scaler 148 may output a single vertically scaled pixel per clock cycle to horizontal scaler 158.

Horizontal scalers 152-158 may output scaled pixels to the next stage (not shown) of the graphics pipeline. In one embodiment, the next stage may be a normalization unit. In another embodiment, horizontal scalers 152-158 may output scaled pixels to a display unit or display controller. In a further embodiment, horizontal scalers 152-158 may output scaled pixels to memory. In other embodiments, there may be other numbers of vertical and horizontal scalers.

Figure 11:
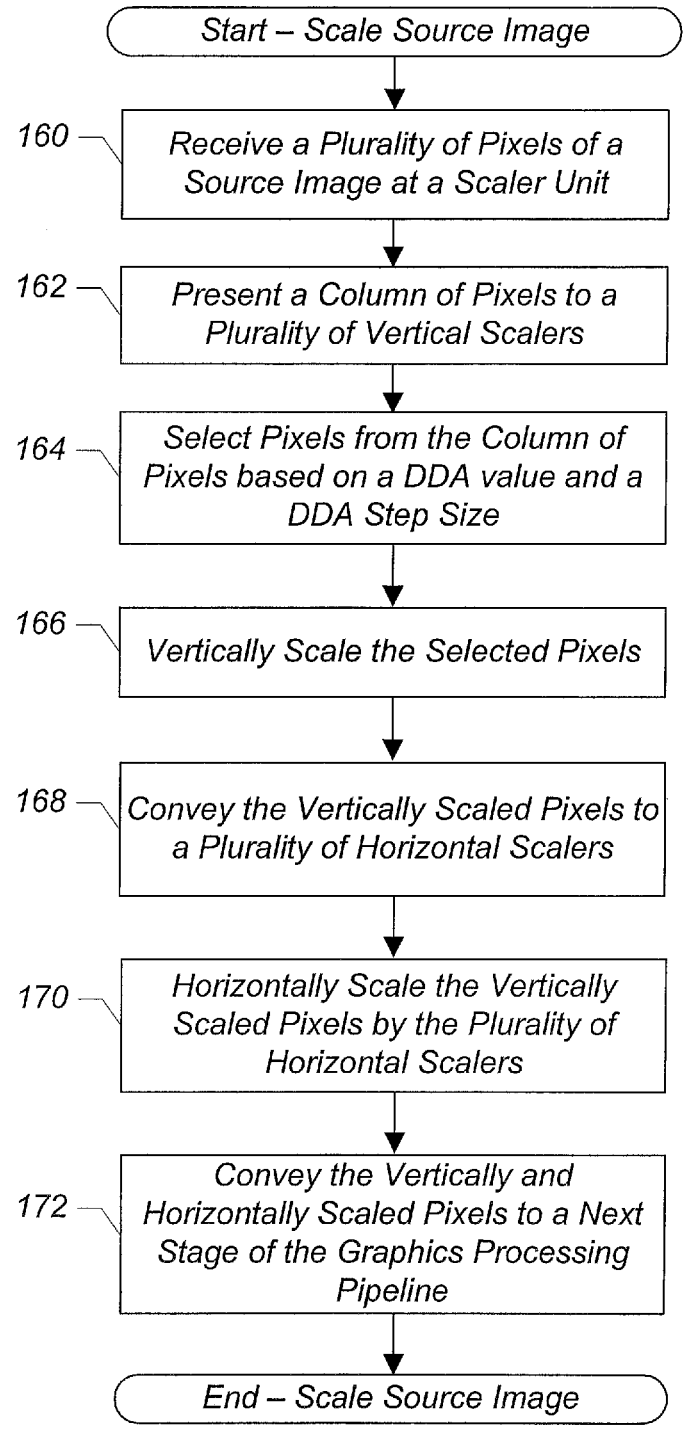
FIG. 11 is a generalized flow diagram illustrating one embodiment of a method for scaling a source image.

Turning now to FIG. 11, one embodiment of a method for scaling a source image is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a plurality of pixels of a source image may be received by a scaler unit (block 160). In various embodiments, the source image may be stored in a memory, stored in tile buffers, conveyed to the scaler unit by a previous stage in a graphics processing pipeline, or stored in any of various other locations or conveyed by any of various other units. Next, a column of pixels may be presented to a plurality of vertical scalers (block 162). Then, each vertical scaler may select pixels from the column of pixels based on a DDA value and a DDA step size (block 164). In one embodiment, each vertical scaler may include a five-tap polyphase filter, and each vertical scaler may select five pixels for the five taps of the filter.

After block 164, the selected pixels may be vertically scaled by each of the plurality of vertical scalers (block 166). In one embodiment, four vertical scalers may be utilized, although in other embodiments, other numbers of vertical scalers may be utilized. Then, the vertically scaled pixels may be conveyed to a plurality of horizontal scalers (block 168). In one embodiment, each vertical scaler may be coupled to a corresponding horizontal scaler. In an embodiment with four vertical scalers, there may be four horizontal scalers.

Next, the vertically scaled pixels may be horizontally scaled by the plurality of horizontal scalers (block 170). Each of the plurality of horizontal scalers may shift the vertically scaled pixels into and through a chain of shift registers, and after the chain has been filled with vertically scaled pixels, the horizontal scaler may generate a horizontally scaled pixel. Then, the vertically and horizontally scaled pixels may be conveyed to a next stage of the graphics processing pipeline (block 172). In one embodiment, the next stage of the pipeline may be a normalization unit. Alternatively, in other embodiments, the vertically and horizontally scaled pixels may be conveyed to a memory location, to a display controller, or to a display unit.

Figure 12:
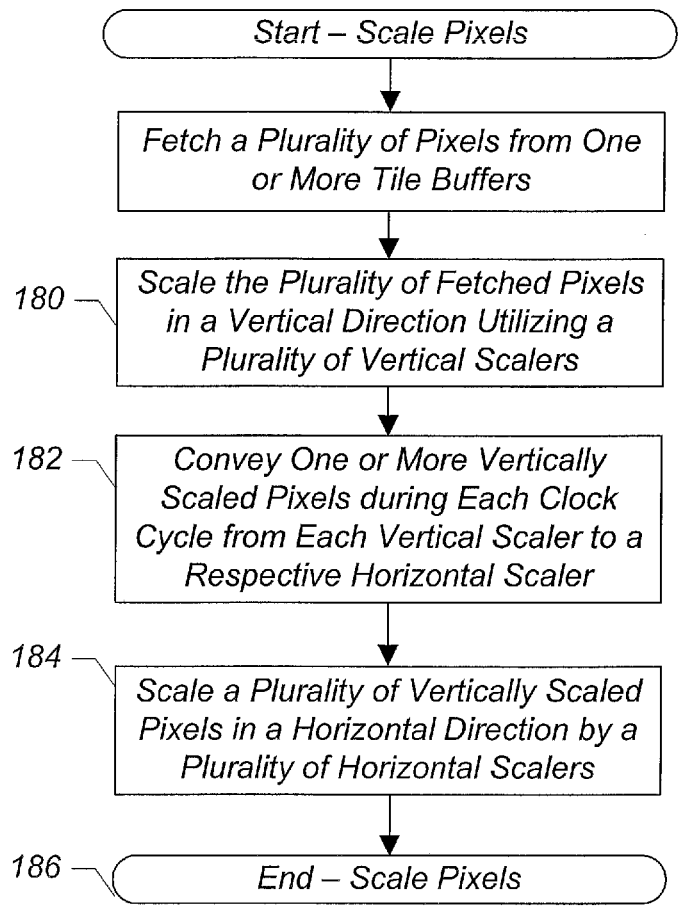
FIG. 12 is a generalized flow diagram illustrating one embodiment of a method for scaling pixels.

Referring now to FIG. 12, one embodiment of a method for scaling pixels is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a plurality of pixels may be fetched from one or more tile buffers (block 180). A source image may be partitioned into a plurality of tiles, and each tile buffer may store a single tile from the source image. In one embodiment, the plurality of fetched pixels may be located in a single column of the source image. Next, the plurality of fetched pixels may be scaled in a vertical direction by a plurality of vertical scalers (block 182). The plurality of vertical scalers may be configured to simultaneously scale the plurality of fetched pixels. Each vertical scaler of the plurality of vertical scalers may include a multi-tap polyphase filter for scaling fetched pixels.

One or more vertically scaled pixels may be conveyed during each clock cycle from each vertical scaler to a respective horizontal scaler (block 184). Then, a plurality of vertically scaled pixels may be scaled in a horizontal direction by a plurality of horizontal scalers (block 186). Each horizontal scaler may include a multi-tap polyphase filter for scaling received pixels. Each horizontal scaler may also include a chain of shift registers to shift in the received pixels, and there may be a shift register corresponding to each tap of the multi-tap polyphase filter.

Figure 13:
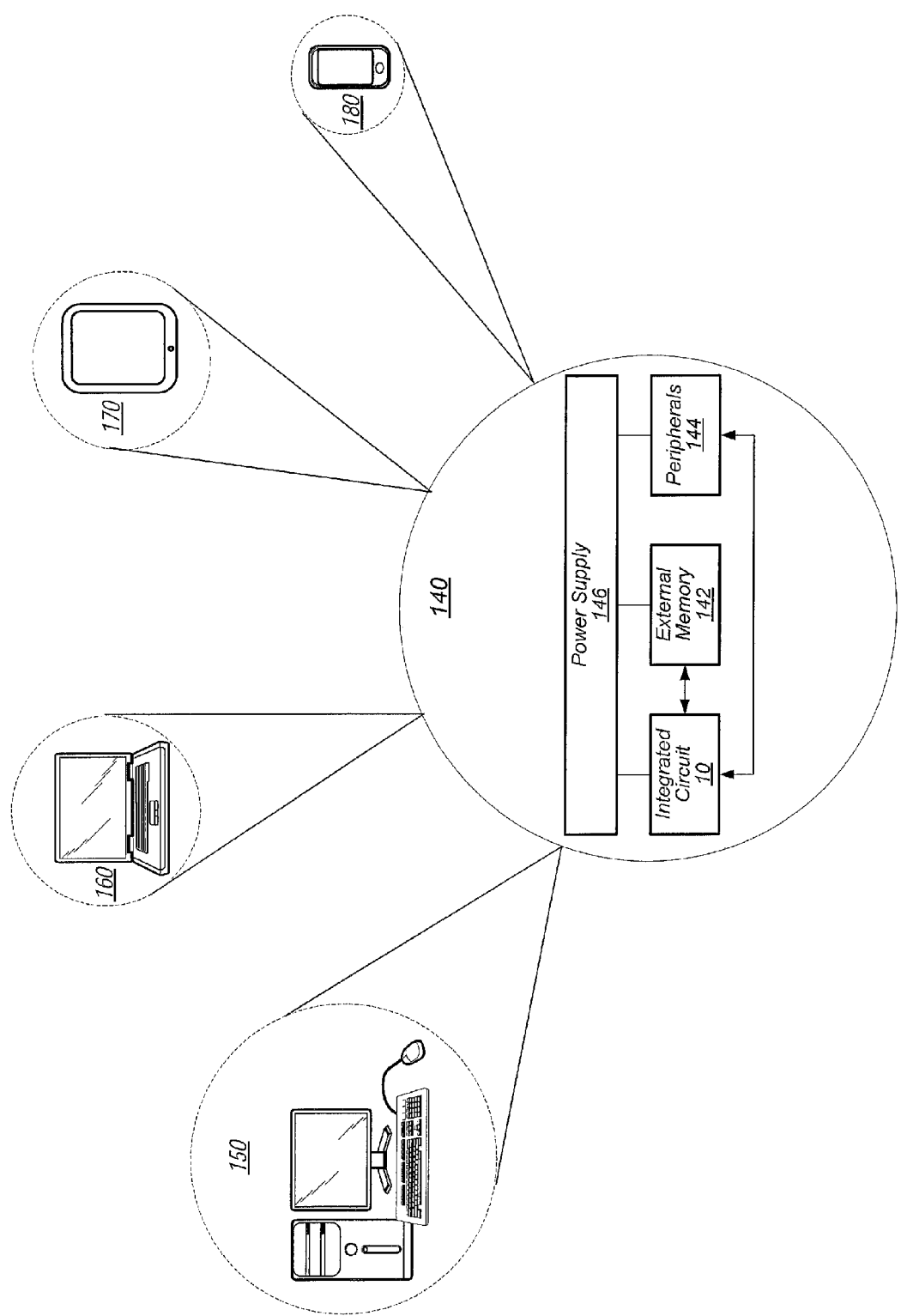
FIG. 13 is a block diagram of one embodiment of a system.

Turning next to FIG. 13, a block diagram of one embodiment of a system 190 is shown. As shown, system 190 may represent chip, circuitry, components, etc., of a desktop computer 200, laptop computer 210, tablet computer 220, cell phone 230, or otherwise. In the illustrated embodiment, the system 190 includes at least one instance of an integrated circuit 198 coupled to an external memory 192. Integrated circuit 198 may include one or more instances of pipeline 10 (of FIG. 1) or one or more portions of pipeline 10.

The integrated circuit 198 is coupled to one or more peripherals 194 and the external memory 192. A power supply 196 is also provided which supplies the supply voltages to the integrated circuit 198 as well as one or more supply voltages to the memory 192 and/or the peripherals 194. In various embodiments, power supply 196 may represent a battery (e.g., a rechargeable battery in a smart phone, laptop or tablet computer). In some embodiments, more than one instance of the integrated circuit 198 may be included (and more than one external memory 192 may be included as well).

The memory 192 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 198 in a chip-on-chip configuration, a package-on-package configuration, or a multi-chip module configuration.

The peripherals 194 may include any desired circuitry, depending on the type of system 190. For example, in one embodiment, peripherals 194 may include devices for various types of wireless communication, such as wifi, Bluetooth, cellular, global positioning system, etc. The peripherals 194 may also include additional storage, including RAM storage, solid state storage, or disk storage. The peripherals 194 may include user interface devices such as a display screen, including touch display screens or multitouch display screens, keyboard or other input devices, microphones, speakers, etc.

Figure 14:
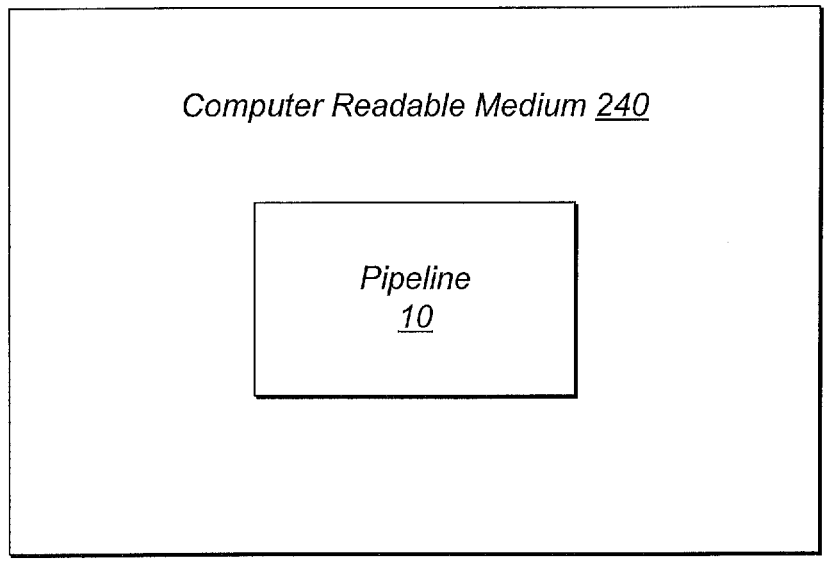
FIG. 14 is a block diagram of one embodiment of a computer readable medium.

Turning now to FIG. 14, one embodiment of a block diagram of a computer readable medium 240 including one or more data structures representative of the circuitry included in pipeline 10 (of FIG. 1) is shown. Generally speaking, computer readable medium 240 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 240 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 240 may be the netlist(s) (with or without the synthesis library) or the data set(s), as desired. In yet another alternative, the data structures may comprise the output of a schematic program, or netlist(s) or data set(s) derived therefrom.

While computer readable medium 240 includes a representation of pipeline 10, other embodiments may include a representation of any portion or combination of portions of pipeline 10 (e.g., vertical scalers, horizontal scalers).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a plurality of vertical scalers, wherein the plurality of vertical scalers are provided with pixels in parallel, said pixels corresponding to a single source image, and wherein each vertical scaler is configured to select pixels for vertical scaling from the pixels and to generate a vertically scaled pixel; and a plurality of horizontal scalers, wherein each horizontal scaler is coupled to an output of a respective vertical scaler and is configured to perform horizontal scaling on pixels corresponding to the single source image received from the respective vertical scaler;

wherein the pixels are located within a single column of the source image, and wherein the single column spans one or more tiles of the source image; and wherein each vertical scaler is further configured to utilize a digital differential analyzer (DDA) value and DDA step size to scale a source image.

2. The apparatus as recited in claim 1, wherein each horizontal scaler of the plurality of horizontal scalers comprises a chain of shift registers for storing vertically scaled pixels received from a respective vertical scaler.

3. The apparatus as recited in claim 1, further comprising a fetch unit, wherein the fetch unit is configured to:

fetch a column of pixels from one or more tile buffers, wherein each tile buffer stores a given tile of a source image; and convey the column of pixels to the plurality of vertical scalers.

4. The apparatus as recited in claim 1, wherein the one or more tiles of the source image are stored in one or more tile buffers.

5. The apparatus as recited in claim 1, wherein the plurality of vertical scalers are arranged in a vertical column to process a different vertical portion of each column of pixels, and wherein each vertical scaler is a single DDA step away from an adjacent vertical scaler.

6. The apparatus as recited in claim 1, further comprising a rotation unit, wherein a source image is rotated by the rotation unit prior to being conveyed to the plurality of vertical scalers.

7. The apparatus as recited in claim 1, wherein each of the plurality of vertical and horizontal scalers comprises a multi-tap polyphase filter for scaling pixels, and wherein each tap of the multi-tap polyphase filter comprises a coefficient table, and wherein the coefficient table comprises a plurality of programmable registers.

8. A method comprising:

receiving a plurality of pixels from a single source image; and generating vertically and horizontally scaled pixels utilizing a plurality of vertical scalers and a plurality of horizontal scalers;

wherein generating vertically and horizontally scaled pixels comprises:

vertically scaling a column of pixels utilizing the plurality of vertical scalers;

conveying the vertically scaled pixels to the plurality of horizontal scalers; and horizontally scaling the vertically scaled pixels utilizing the plurality of horizontal scalers;

each vertical scaler of the plurality of vertical scalers selecting pixels from the plurality of received pixels based on a direct differential analyzer (DDA) value and DDA step size prior to vertically scaling the column of pixels.

9. A method comprising:

fetching a plurality of pixels corresponding to a single source image from one or more tile buffers;

scaling the plurality of fetched pixels in a vertical direction utilizing a plurality of vertical scalers;

conveying one or more vertically scaled pixels during each clock cycle from each vertical scaler to a respective horizontal scaler; and scaling a plurality of vertically scaled pixels in a horizontal direction utilizing a plurality of horizontal scalers;

wherein each vertical scaler and each horizontal scaler comprises a multi-tap polyphase filter.

10. The method as recited in claim 9, wherein the plurality of fetched pixels are located in a single column of the source image.

11. The method as recited in claim 9, wherein the plurality of vertical scalers are configured to simultaneously scale the plurality of fetched pixels.

12. The method as recited in claim 9, wherein each horizontal scaler of the plurality of horizontal scalers comprises a plurality of shift registers connected in a chain, and wherein the chain comprises a shift register corresponding to each tap of the multi-tap polyphase filter.

13. An apparatus comprising:

a plurality of vertical scalers, wherein the plurality of vertical scalers are provided with pixels in parallel, and wherein each vertical scaler is configured to select pixels for vertical scaling from the pixels and to generate a vertically scaled pixel;

a plurality of horizontal scalers, wherein each horizontal scaler is coupled to an output of a respective vertical scaler and is configured to perform horizontal scaling on pixels received from the respective vertical scaler; and a rotation unit, wherein a source image is rotated by the rotation unit prior to being conveyed to the plurality of vertical scalers.

14. An apparatus comprising:

a plurality of vertical scalers, wherein the plurality of vertical scalers are provided with pixels in parallel, and wherein each vertical scaler is configured to select pixels for vertical scaling from the pixels and to generate a vertically scaled pixel;

a plurality of horizontal scalers, wherein each horizontal scaler is coupled to an output of a respective vertical scaler and is configured to perform horizontal scaling on pixels received from the respective vertical scaler; and wherein each of the plurality of vertical and horizontal scalers comprises a multi-tap polyphase filter for scaling pixels, and wherein each tap of the multi-tap polyphase filter comprises a coefficient table, and wherein the coefficient table comprises a plurality of programmable registers.

* * * * *